US006379104B1

(12) United States Patent
Domino et al.

(10) Patent No.: US 6,379,104 B1
(45) Date of Patent: Apr. 30, 2002

(54) SINGLE SIDE ENTRY CONTAINER LIFTING DEVICE

(75) Inventors: Charles A. Domino, Toms River; Joseph F. Picarello, Howell, both of NJ (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 23 days.

(21) Appl. No.: 09/605,986

(22) Filed: Jun. 29, 2000

(51) Int. Cl.[7] .............................................. B65G 7/00

(52) U.S. Cl. ........................ 414/662; 414/561; 414/628; 414/640; 414/664; 212/319; 212/348

(58) Field of Search ................................ 414/495, 561, 414/628, 629, 639–642, 662, 664, 667, 668, 671, 673; 212/319, 327, 330, 348, 349

(56) References Cited

U.S. PATENT DOCUMENTS

| | | | | |
|---|---|---|---|---|
| 4,502,709 A | | 3/1985 | Schaeff | |
| 4,580,650 A | | 4/1986 | Matsuda | |
| 4,585,268 A | | 4/1986 | Downing | |
| 4,657,471 A | | 4/1987 | Shinoda et al. | |
| 5,314,083 A | * | 5/1994 | Wiggershaus et al. | 212/319 |
| 5,326,217 A | * | 7/1994 | Simpson et al. | 414/667 |
| 5,489,033 A | * | 2/1996 | Luebke | 212/319 |
| 5,509,774 A | | 4/1996 | Yoo | |
| 5,586,619 A | | 12/1996 | Young | |
| 5,618,154 A | * | 4/1997 | Irons et al. | 414/673 |
| 5,722,511 A | | 3/1998 | Wakamiya | |
| 5,758,747 A | | 6/1998 | Okazaki et al. | |
| 5,829,948 A | | 11/1998 | Becklund | |
| 5,984,050 A | | 11/1999 | Ronald | |

* cited by examiner

*Primary Examiner*—Joseph E. Valenza
(74) *Attorney, Agent, or Firm*—Mark Homer

(57) ABSTRACT

A lifting apparatus including a horizontal framework having a connector connected to a bridge crane trolley and a motor mounted on the horizontal framework, a telescoping mast unit coupled to one side of the horizontal framework and having upper, middle, and lower mast assembly and adjusting a height of the lifting apparatus, a fork tine assembly adjusting the tine center to center distance, and a counterbalance coupled to the other side of the horizontal framework is provided. The horizontal framework is coupled to an overhead bridge crane and is accessible to any load located within a minimum amount of aisle space.

13 Claims, 6 Drawing Sheets

SINGLE SIDE ENTRY CONTAINER LIFTING DEVICE

BACKGROUND OF THE INVENTION

1. Field of the Invention

The present invention relates to a lifting device, and more particularly to a lifting apparatus of adjusting spaced-apart tines to fit a load depending on fork pocket spacing and height of the load.

2. Brief Description of the Prior Art

Fork tines have been used for lifting and moving a load. Typically, fork tines mounted on a frame of a lifting apparatus are spaced-apart from each other. Because a height of the frame fixed, the lifting apparatus is limited to use for lifting and carrying a fixed-sized load. A plurality of lifting apparatuses or a bulky and complicated lifting apparatus have been used for various sized loads.

Moreover, depending on various sizes of the height and the length of the loads, the lifting apparatus having one dimensional adjustment is not enough to lift and move the various sized loads. Furthermore, due to the fork tines being shorter than width of a flatbed trailer, access to containers on the opposite side of the flatbed requires additional time and space to maneuver the forklift.

In efforts of adjusting the distance between fork tines or a height of the frame in the lifting apparatus, U.S. Pat. No. 5,984,050 for a Carriage Suspension For Lift Truck issued to Ronald, U.S. Pat. No. 5,829,948 for a Multipurpose Lift Apparatus and Method issued to Becklund, U.S. Pat. No. 5,758,747 for a Mast Support for Forklift issued to Okazaki et al., U.S. Pat. No. 5,722,511 for a Lifting Vehicle and Method of Operating the Vehicle issued to Wakamiya, U.S. Pat. No. 5,586,619 or a lifting Apparatus issued to Young, U.S. Pat. No. 5,509,774 for a Load Clamping apparatus with an Increased Extent of Vertical Movement issued to Yoo, U.S. Pat. No. 4,657,471 for a Load Lifting Unit For a lift Truck issued to Shinoda et al. disclose various types of lifting apparatuses having the fork tines. These references, however, show mechanisms adjusting only one dimension of the fork tines depending on the size of the load or complicated mechanisms adjusting one or two dimensions of the fork tines and including a tractor or a truck.

In efforts of maintaining the balance of the lifting apparatus, U.S. Pat. No. 4,585,268 for a Overhead Guard For Lift Trucks Of Different Length issued to Downing, U.S. Pat. No. 4,580,650 for a Industrial Truck issued to Matsuda, and U.S. Pat. No. 4,502,709 for an Articulated Loader With Transversely Displaceable Counterweight issued to Schaeff disclose various types of counterbalance using a lifting truck. These references, however, fail to show the counterbalance used in a lifting apparatus lifting loads or containers accessed only from one side of the loads to be picked up and moved to a staging area with the use of a crane.

Regarding screw jack mechanisms, U.S. Pat. No. 5,118,082 for a Electrical Operated Screw-Type Jack issued to Byun, U.S. Pat. No. 4,641,813 for a Dual Automobile Jack For Consumer Use issued to Arzouman, and U.S. Pat. No. 4,609,179 for a Screw Jack issued to Chem et al. disclose typical structures of screw jacks. These references, however, do not show any application for a lifting apparatus.

Therefore, we have noticed that the conventional method and apparatus fail to show a lifting device having a variable range of frame height, tine spacing, and tilt angle of the fork tines. Moreover, when the various sized loads should be located in a limited space or a designated storage location, and are accessed only from one side of the loads to be picked up and moved to a staging area with the use of a crane, the conventional lifting apparatus cannot move within the space and carry the various sized loads into the limited space.

SUMMARY OF THE INVENTION

It is an object of the present invention to provide a lifting apparatus suitable to lift and carry all various sized loads.

It is another object of the present invention to provide a lifting apparatus able to load a container into a limited space and a designated storage location.

It is yet another object to provide a lifting apparatus able to adjust any height of a frame or a distance between fork tines.

It is still yet another object to provide a lifting apparatus able to balance when lifting and moving the load accessed only from one side of a flatbed trailer.

It is a further object to provide a lifting apparatus able to access a load within a minimum amount of aisle space.

These and other objects may be achieved by providing a lifting apparatus including a horizontal framework, a telescoping mast coupled to one side of the horizontal framework, a telescoping mast unit having upper, middle, and lower telescoping mast assemblies, and a pair of fork tine assemblies movably mounted on the lower telescoping mast assembly. The horizontal framework is coupled to an overhead bridge crane and is accessible to any load located within a minimum amount of aisle space. A counterbalance is mounted on the other side of the horizontal framework.

The horizontal framework includes a pair of horizontal supporters spaced-apart from each other. Connectors formed on horizontal framework are attached to a bridge crane trolley by securing to the hooks or twist lock connectors of the bridge crane trolley into the connectors.

An electric motor mounted on the horizontal framework is connected by a shaft to an assembly of power screws. The other end of the vertical screw is inserted into a fixed nut on the middle mast assembly.

Upper mast assembly is mounted beneath of the horizontal framework and includes two upper vertical beams spaced-apart from each other and two upper horizontal side bars attached to the spaced-apart upper vertical beams to maintain a distance between the spaced-apart upper vertical beams. Pairs of rails are formed on the upper vertical beams. The vertical screws are rotatably mounted on the upper mast assembly.

A middle mast assembly coupled to the vertical screw of the upper mast assembly through the fixed nut includes two middle vertical beams spaced-apart from each other and two middle horizontal beams attached to spaced-apart middle vertical beams to maintain a distance between the spaced-apart middle vertical beams. Two pairs of rails formed on the two middle vertical beams have a telescoping relationship with each pair of rails of the upper vertical beams.

A lower mast assembly includes two lower vertical beams spaced-apart from each other and lower horizontal beams, each end coupled to the spaced-apart lower vertical beams. A lifting chain is coupled to both the upper and lower mast assemblies through a pulley rotatably mounted on the middle horizontal beam of the middle mast assembly. An anchor is secured to the lower horizontal beam. The lifting chain has one end connected to the anchor and the other end connected to the upper horizontal side bar of the upper mast assembly while a portion of the lifting chain is wound around a peripheral surface of the pulley. A fork tine assembly is mounted on the lower mast assembly, and two fork tines are spaced-apart from each other by a pair of tine drive motors mounted on the lower mast assembly.

The combined upper, middle, and lower mast assemblies are tilted from the vertical position with the use of two tilt drive power screws. These power screws are rotatably mounted on the horizontal framework. Mechanical power is supplied to the screws through an electric motor and shaft mounted on each side of the horizontal framework. The other end of each tilt drive power screw is rotatably attached to the lower end of the upper mast assembly vertical beams.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Hereinafter an embodiment according to the principle of the present invention will be described in detail with reference to accompanying drawings.

Figure 1:
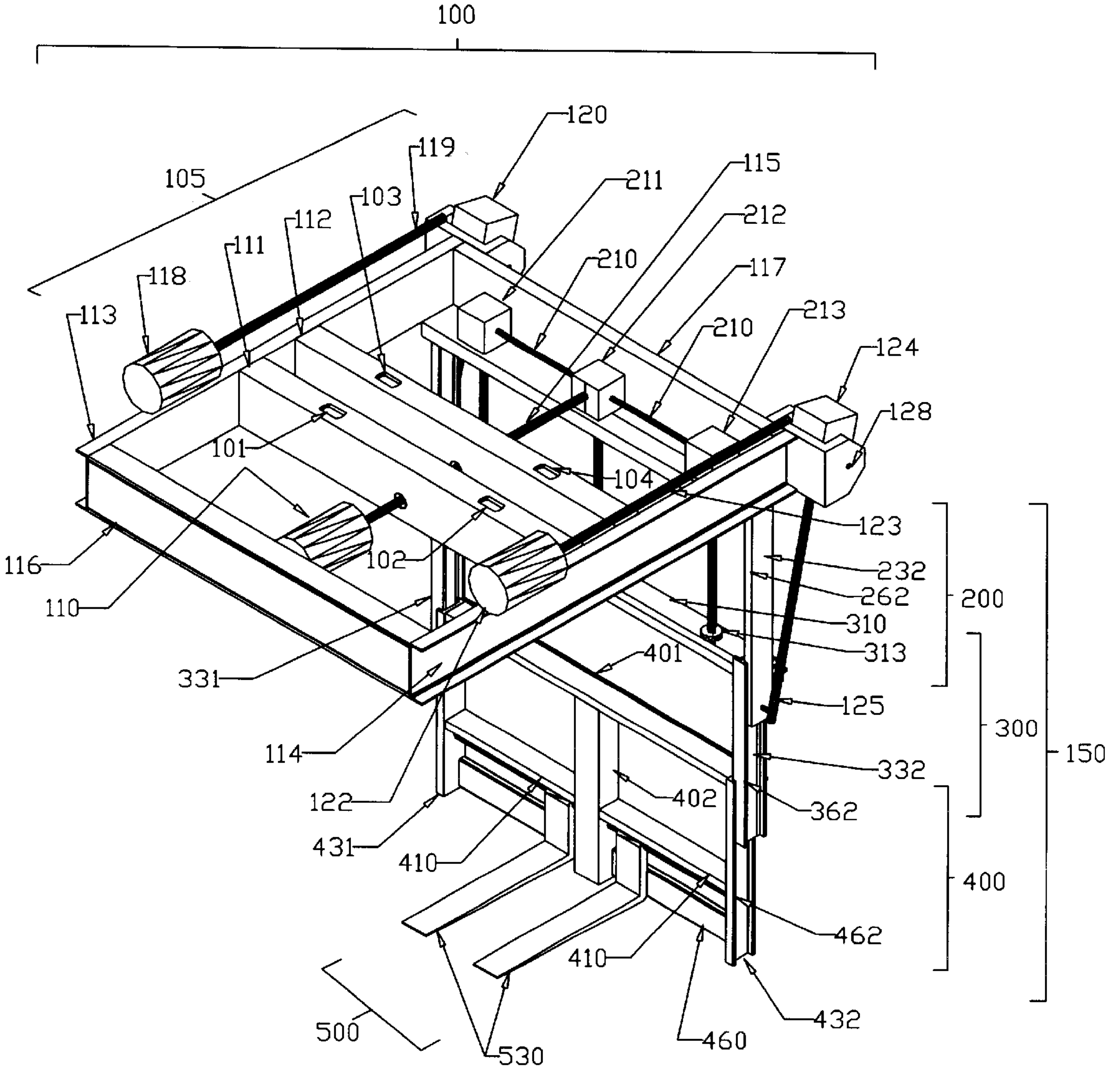
FIG. 1 is a perspective view showing a lifting apparatus according to the principle of the present invention.
Figure 2:
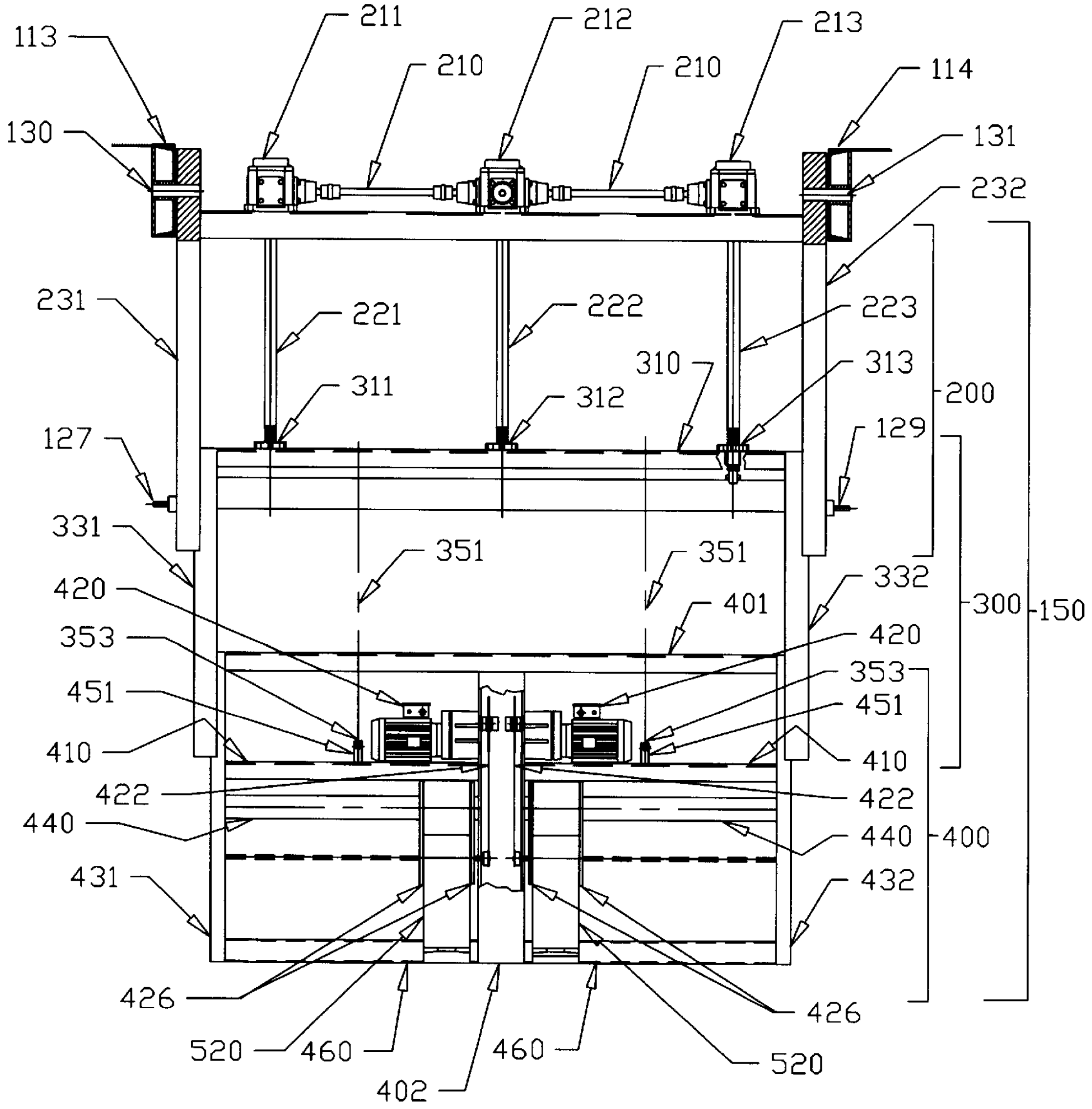
FIG. 2 is a partial cross-sectional view illustrating a telescoping mast unit of the lifting apparatus.
Figure 3:
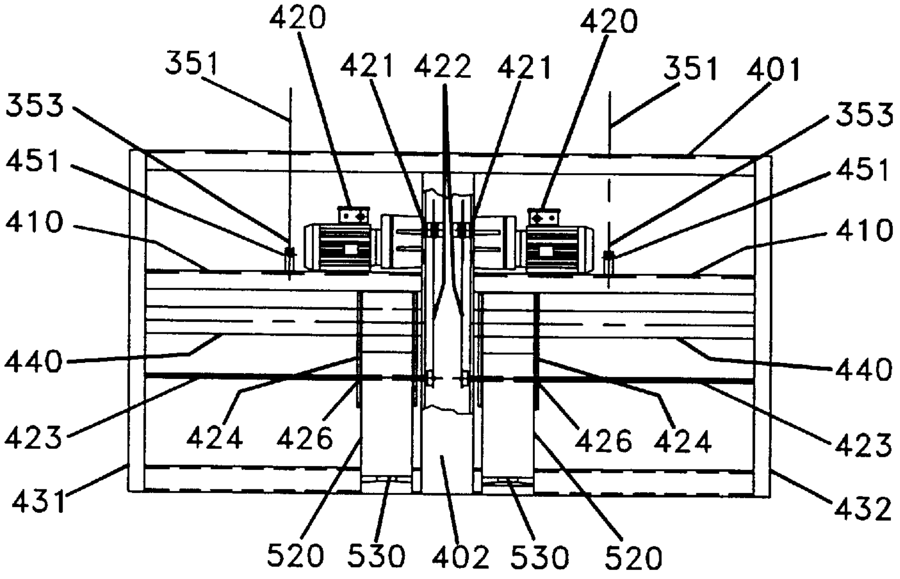
FIG. 3 is a partial cross-sectional view illustrating a lower mast assembly of the lifting apparatus.
Figure 4:
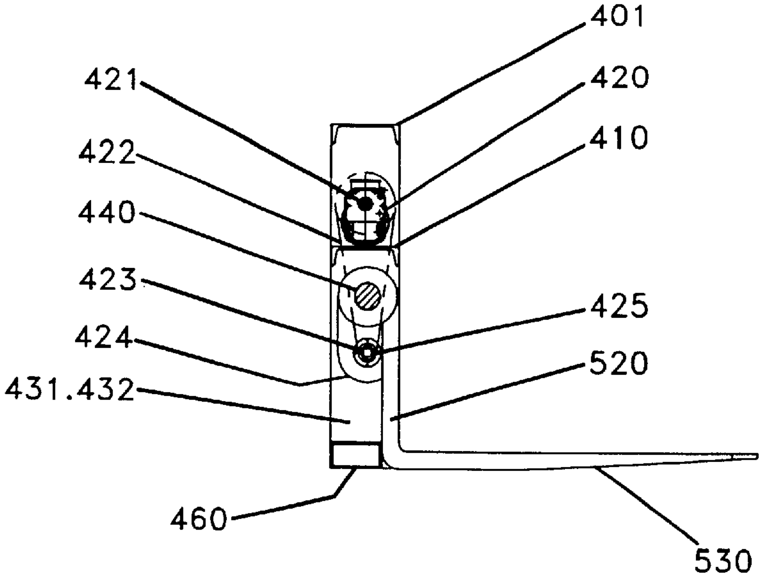
FIG. 4 is a partial cross-sectional view illustrating a tine unit of the lifting apparatus.

Referring now to FIGS. 1 and 2, a container lifting device 100 includes a horizontal framework 105, a telescoping mast unit 150 coupled to one side of horizontal framework 105 and including upper, middle, and lower mast assemblies 200, 300, 400, a counterbalance 116, used to balance the lifting device 100 when empty, coupled to the other side of horizontal framework 105, a spreader beam 117 connected to the horizontal framework above the telescoping mast unit 150, and a pair of fork tine assemblies 500 mounted on lower mast assembly 400. Horizontal framework 105 defines a pair of main beams 111 and 112 spaced-apart from each other and a pair of side beams 113 and 114 secured to both spaced-apart main beams 111 and 112. Four connectors 101, 102, 103, and 104 are formed on main beams 111 and 112 and connected to a bridge crane trolley not shown. Lifting device 100 is connected to the bridge crane trolley by securing the bridge crane trolley to connectors 101, 102, 103, and 104, and moves toward and away from the various sized loads located in a limited space or a designated storage location and accesses one side of the loads to pick up and move the loads to a staging area with the use of the crane.

An electric motor 110 is mounted on one of main beams 111 or 112 and a counterbalance 116 in horizontal framework 105. A longitudinal main shaft 115 extended from electric motor 110 and passing through holes formed on main beams 111 and 112 is coupled to a plurality of power screw jacks 211, 212, and 213 through an extended shaft 210. Vertical screws 221, 222, and 223 are rotatably mounted on upper mast assembly 200 and are coupled to extending shaft 210 within power screw jacks 211, 212, and 213.

Figure 5:
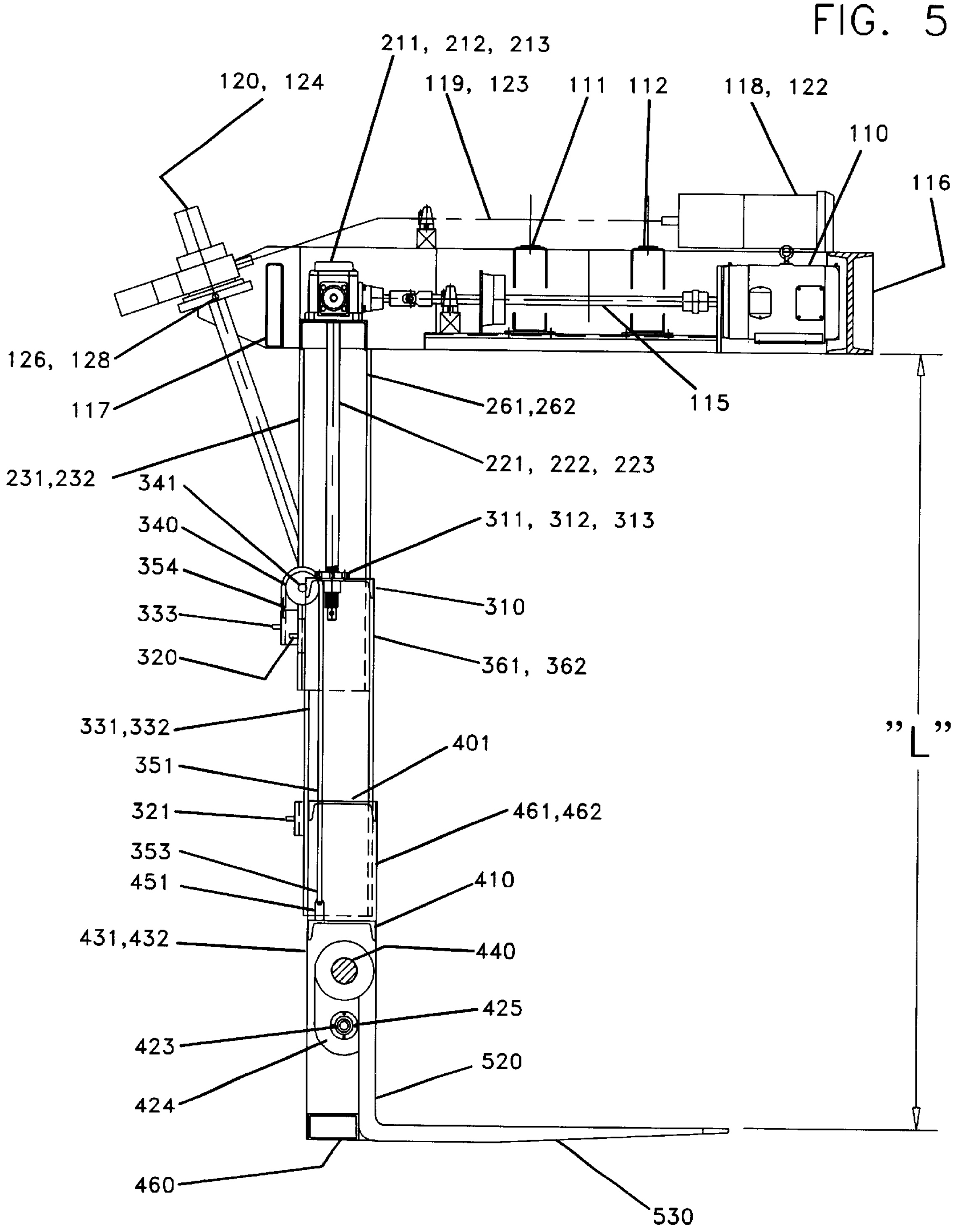
FIG. 5 is a partial cross-sectional view illustrating a maximum height of the telescoping mast unit of the lifting apparatus.
Figure 7:
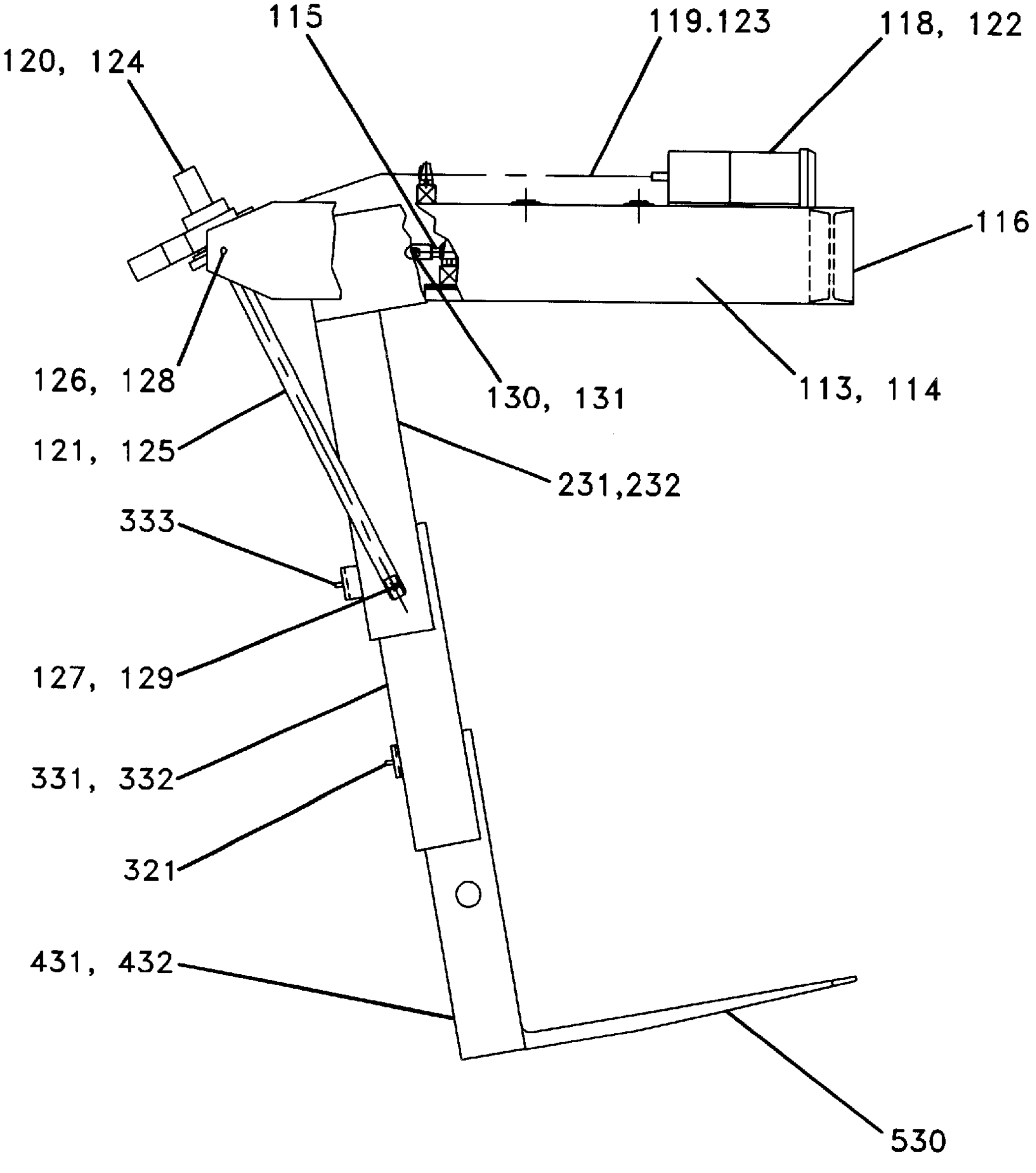

Upper mast assembly 200 is secured to horizontal framework 105 through two pivots 130 and 131 and defines two upper vertical beams 231 and 232 spaced-apart from each other and having upper ends attached to both said side beams 113 and 114 or main beams 111 and 112. Referring to FIGS. 1, 5, and 7, an upper horizontal side bar 333 is attached to spaced-apart upper vertical beams 231 and 232 to maintain a distance between spaced-apart upper vertical beams 231 and 232. Pairs of rails 261 and 262 are formed on upper vertical beams 231 and 232.

Power screw jacks 211, 212, and 213 are mounted on upper mast assembly 200 and disposed to be coupled to extended shaft 210. Vertical screws 221, 222, and 223 are coupled to extended shaft 210 within corresponding power screw jacks 211, 212, and 213 and are extended to middle mast assembly 300 and coupled to corresponding fixed nuts 311, 312, and 313. Vertical screws 221, 222, and 223 rotate by the rotation of extended shaft 210, main shaft 115, and electric motor 110. One end of vertical screws 221, 222, and 223 are coupled to extended shaft 210 within power screw jacks 211, 212, and 213 while the other end of vertical screws 221, 222, and 223 are inserted into holes formed on middle horizontal beam 310 through fixed nuts 311, 312, and 313. A thread portion formed inside of fixed nuts 311, 312, and 313 is coupled to a tooth portion formed on peripheral outside of vertical screws 221, 222, and 223.

Power tilt screw jacks 120 and 124 are mounted on horizontal framework 105 using spreader beam 117 through pivot shafts 126 and 128 and disposed to be coupled to input shafts 119 and 123. Power tilt screw shafts 121 and 125 rotate by the rotation of input shafts 119 and 123, and tilt motors 118 and 122. Power tilt screw jacks are also attached to upper frame members 231 and 232 through pivot shafts 127 and 129.

Instead of using the power tilt screw jacks 120 and 124, input shafts 119 and 123 and tilt motors 118 and 122, a pair of hydraulic or pneumatic cylinders can be attached at one end to spreader beam 117 using pivot shafts 126 and 128 with the opposite end attached to upper frame member pivot shafts 127 and 129.

Middle mast assembly 300 is coupled to vertical screw 221, 222, and 223 of upper mast assembly 200 through fixed nuts 311, 312, and 313 and defines two middle vertical beams 331 and 332, spaced-apart from each other, a middle horizontal beam 310, and two middle side bars 320 and 321 that are attached to spaced-apart middle vertical beams 331 and 332 to maintain a distance between them. Two pairs of rails 361 and 362 formed on two middle vertical beams 331 and 332 have a telescoping relationship with each of rails 261 and 262 of upper vertical beams 231 and 232. Rotation of vertical screws 221, 222, and 223 causes fixed nuts 311, 312, and 313 to move up and down along vertical screws 221, 222, and 223 depending on the rotating direction of vertical screws 221, 222, and 223. Since fixed nuts 311, 312, and 313 are attached to middle horizontal beam 310 and move along vertical screws 221, 222, and 223 middle vertical beams 331 and 332 slidably move along the inside of upper vertical beams 231 and 232. Thus, middle mast assembly 300 moves up toward and down from horizontal framework 105.

As shown in FIGS. 1 through 4, lower mast assembly 400 defines two lower vertical beams 431 and 432 spaced-apart from each other, lower horizontal beams 401 and 410 each end coupled to spaced-apart lower vertical beams 431 and 432. Lifting chain 351 is coupled to both upper and lower mast assemblies 200 and 400 through a pulley 340 rotatably mounted on middle horizontal beam 310 of middle mast assembly 300. Anchor 451 is secured to lower horizontal beam 410. Lifting chain 351 has one end 353 connected to anchor 451 and the other ends 354 connected to upper horizontal side bar 333 of upper mast assembly 200 while a portion of lifting chain 351 is wound around a peripheral surface of pulley 340.

When middle mast assembly 300 moves up along vertical screws 221, 222, and 223 toward horizontal framework 105, pulley 340 moves away from upper horizontal side bar 333 and toward horizontal framework 105. Since lifting chain 351 is wound around pulley 340 mounted on middle horizontal beam 310 of middle mast assembly 300 and rotating about an axis 341 mounted on middle horizontal beam 310 of middle mast assembly 300, and each end 353 and 354 of lifting chains 351 is coupled to lower horizontal beam 410 of lower mast assembly 400 and upper horizontal side bar 333 of upper mast assembly 200 respectively, lower mast assembly 400 moves toward middle and upper mast assemblies 300 and 200 and horizontal framework 105. If middle mast assembly 300 moves up toward upper mast assembly 200 and horizontal framework 105, pulley 340 becomes located on the halfway portion of lifting chains 351. On the contrary, if middle mast assembly 300 moves down from upper mast assembly 200 and horizontal framework 105, lower mast assembly 400 moves away from middle and upper mast assemblies 300 and 200 and horizontal framework 105 simultaneously. Pulley 340 becomes located adjacent to a portion of the end 354 of lifting chain 351.

Figure 6:
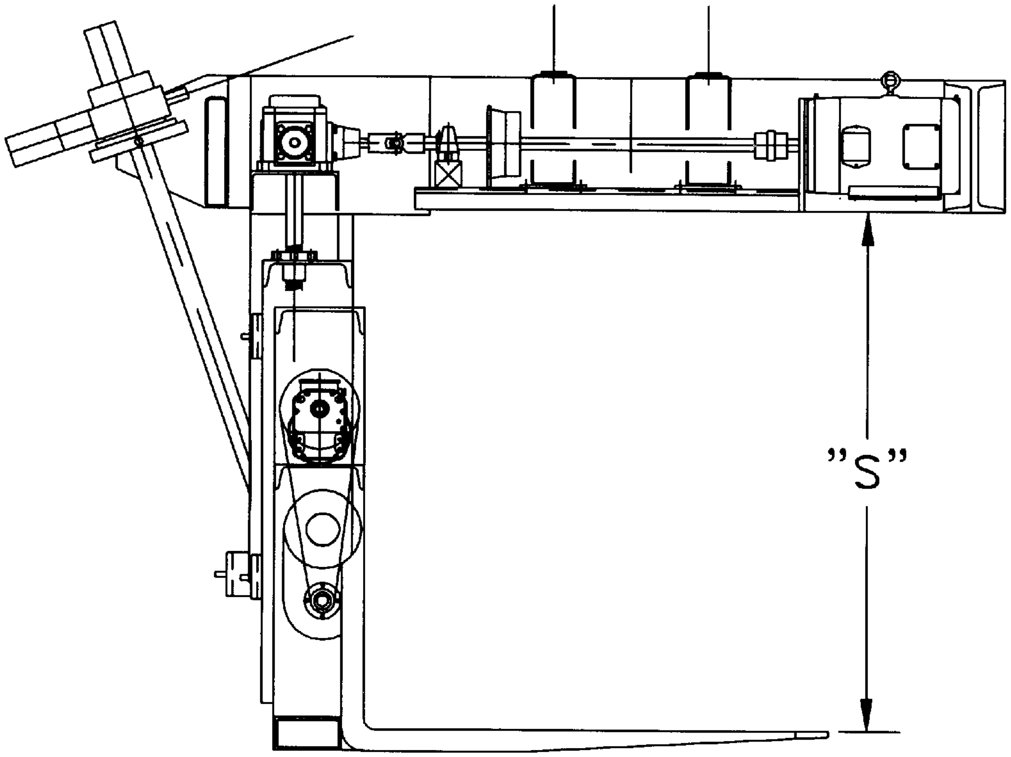
FIG. 6 is a partial cross-sectional view illustrating a minimum height of the telescoping mast unit of the lifting apparatus; and, FIG. 7 is a partial cross-sectional view illustrating the telescoping mast unit of the lifting apparatus in the tilted position.

Therefore, a height of the telescoping mast unit 150 including upper, middle, and lower mast assemblies 200, 300, and 400 can be adjusted depending on the height of a container or a load. A maximum height L of the telescoping mast assembly is shown in FIG. 5 while a minimum height S of the telescoping mast assembly is shown in FIG. 6. Rail 461 of lower vertical beam 431 slides into inside of rail 361 of middle vertical beam 331 which slides into inside of rail 261 of upper vertical beam 231 while rail 462 of lower vertical beam 432 slides over the outside surface of rail 362 of middle vertical beam 332 which slides over the outside surface of rail 262 of upper vertical beam 232 during adjusting the height of the telescoping mast unit 150. The height of lifting device 100 is adjusted by electric motor 110 and the telescoping mast unit 150 including upper, middle, and lower mast assemblies 200, 300, and 400. Instead of horizontal motor 110, main shaft 115, power screw jacks 211, 212, and 213, and extended shaft 210, a pair of hydraulic or pneumatic cylinders can be mounted on the horizontal frame assembly 105 or upper mast assembly 200. The cylinder is connected to lower mast assembly 400 and middle mast assembly 300 with lifting chains 351.

Referring now to FIGS. 2–5, a tine unit 500 is mounted on lower mast assembly 400. A pair of tine drive motors 420 are mounted on lower horizontal beam 410 of lower mast assembly 400. Longitudinal tine screw 423 is rotatably mounted on spaced-apart lower vertical beams 431 and 432 and internal vertical beam 402 and is connected to tine drive motor 420 through a shaft 421 and a pulley and belt 422. A traveling frame 424 having a threaded nut 425 and two spaced-apart guide protrusions 426 is coupled to a thread portion of tine screw 423 and moves along an axis of tine screw 423. Two ends of tine screw 423 are fixed to spaced-apart lower vertical beams 431 and 432 and internal vertical beam 402 respectively after tine screw 423 is inserted into threaded nut 425 attached to traveling frame 424. Top portion of tine 520 is located between two spaced-apart guide protrusions 426 of traveling frame 424. Tine 520 slides along tine axle 440 by movement of traveling frame 424 and moves in the same direction of guide protrusions 426 of traveling frame 424. Tine body supporter 460 is disposed to support tine 520 during loading a container or a load on tine extensions 530 of tine 520 thereby preventing tine 520 from rotating about the axis of tine axle 440.

Instead of using the tine screw 423, threaded nut 425, pulley and belt 422, shaft 421 and the tine drive motor 420, a pair of hydraulic or pneumatic cylinders can be attached at one end to the traveling frame 424 with the opposite end attached to lower vertical beams 431 and 432.

Depending on the fork pocket spacing of the container, the distance between tines 520 can be adjusted by tine unit 500 to align with the container fork pockets when tines 520 move along tine axle 440. Therefore, the height and spacing of the fork tines on lifting device 100 are adjusted by electric motor 110 and tine drive motor 420, the telescoping mast unit vertically moving by electric motor 110 and lifting chains 351 and tine unit 500 by tine drive motor 420 respectively depending on the height and fork pocket spacing of the container. Before a container is loaded on tines 520, the lifting device 100 moves toward the container by the bridge crane trolley. While approaching the container, the height and fork tine spacing of the lifting device 100 are adjusted. The container loaded on the tine 520 is carried by the bridge crane trolley coupled to lifting device 100.

Since lifting device 100 accesses one side of the loads or containers to pick up and move the loads to a staging area with the use of the crane, lifting device 100 does not have to be adjusted to the width of the container, and can move toward and away from the various sized loads located in a limited space or a designated storage location.

As described in the above, there are advantages in the lifting device 100 for adjusting the height and fork tine spacing of the lifting device 100 according to the principle of the present invention in that the lifting device 100 includes a horizontal framework 105 having a connection to a bridge crane trolley and an electric motor 110 mounted on the horizontal framework 105, a telescoping mast unit 150 coupled to one side of the horizontal framework 105 and having upper, middle, and lower mast assemblies 200, 300, and 400 adjusting a height of the lifting device 100, a tine unit 500 adjusting a center to center tine 520 spacing of the lifting device 100, and counterbalance 116 coupled to the other side of the horizontal framework 105 thereby giving the lifting device 100 a great amount of adjustability to handle various unit load heights and fork pocket spacing and allowing the lifting device 100 to load containers having different dimensions into a fixed space or even a narrow space.

What is claimed is:

1. A lifting device, comprising:

a horizontal framework;

a telescoping mast unit having a plurality of telescoping mast assemblies, coupled to said horizontal framework, approximately perpendicular to said horizontal framework, wherein said telescoping mast unit vertically moves toward and away from said horizontal framework;

a connector connected to the horizontal framework for suspending the device;

a fork tine unit mounted on one of said telescoping mast assemblies, having a pair of tines spaced-apart from each other;

a power source;

a screw coupled to said power source, coupling said power source to one of said telescoping mast assemblies wherein said telescoping mast unit telescopes through said power source; and, a mast tilting unit wherein said telescoping mast unit pivots in relation to said horizontal framework.

2. A lifting device, comprising:

a horizontal framework;

a telescoping mast unit having a plurality of telescoping mast assemblies, coupled to said horizontal framework, approximately perpendicular to said horizontal framework, wherein said telescoping mast unit vertically moves toward and away from said horizontal framework;

a fixed nut mounted on said telescoping mast unit;

a vertical motor connected rotationally to a vertical screw wherein said vertical screw moves within said fixed nut during rotation;

a power screw jack coupling said vertical motor to said vertical screw;

a fork tine unit mounted on one of said telescoping mast assemblies, having a pair of tines spaced-apart from each other;

a power source; and, said screw coupled to said power source, coupling said power source to one of said telescoping mast assemblies wherein said telescoping mast unit telescopes through said power source.

3. The lifting device of claim 2, wherein said telescoping mast unit further comprises a pulley rotatably mounted on said middle mast assembly, said chain wound around said pulley.

4. The apparatus of claim 3, wherein said fork tine unit comprises a tine drive motor connected to said tines wherein said tine drive motor moves said tines toward and away from each other.

5. The apparatus of claim 4, wherein said fork tine unit further comprises a tine cylinder connecting said tines to said lower mast assembly.

6. The lifting device of claim 4, wherein said fork tine unit further comprises:

a tine screw connected to said tine drive motor, rotatably mounted on said lower mast assembly;

a guide frame coupled to a thread portion of said tine screw, moving along said tine screw while said tine screw rotates by said tine drive motor; and a guide protrusion extended from said guide frame, moving said tines.

7. The lifting device of claim 6, wherein said fork tine unit further comprises:

a tine hole formed on said tine; and a tine axle inserted into said tine hole, fixed on said lower mast assembly, being approximately parallel to said tine screw.

8. The apparatus of claim 7, wherein said fork tine unit further comprises a tine body supporter mounted on said lower mast assembly, disposed to support said tine and prevent said tine from rotating about an axis of said tine axle.

9. The lifting device of claim 8, further comprising:

a first and second side of said horizontal framework substantially opposite one another wherein said telescoping mast unit connects to said first side; and, a counterbalance connected to said second side wherein the lifting device remains substantially balanced when not lifting a load.

10. The lifting device of claim 9, wherein said mast tilting unit comprises:

a plurality of power screw jacks mounted rotatably on said horizontal framework;

at least a motor to power said power screw jacks;

at least an extended shaft connecting said motor to said power screw jacks; and, a plurality of tilt screws coupled to said plurality of power screw jacks, attached rotatably to said upper mast assembly.

11. The lifting device of claim 9, wherein said mast tilting unit comprises:

a cylinder mounted on said horizontal framework; and, a shaft coupled to said cylinder and to said upper mast assembly wherein said upper mast assembly tilts through said cylinder.

12. A process for lifting containers, comprising the steps of:

providing a lifting device comprising a horizontal framework, a telescoping mast unit having a plurality of telescoping mast assemblies, coupled to said horizontal framework, approximately perpendicular to said horizontal framework, wherein said telescoping mast unit vertically moves toward and away from said horizontal framework, a connector connected to the horizontal framework for suspending the device, a fork tine unit mounted on one of said telescoping mast assemblies, having a pair of tines spaced-apart from each other, an upper mast assembly connected to said horizontal framework by a mast tilting unit, a middle mast assembly telescoped into said upper mast assembly and connected to said upper assembly through a vertical screw connected between said middle mast assembly and a vertical motor wherein said vertical motor may turn said vertical screw, and, a lower mast assembly telescoped into said middle mast assembly and connected to said upper mast assembly through a chain supported by said middle mast assembly wherein vertical movement of said middle mast assembly results in vertical movement of said lower mast assembly; and, initiating said lifting device.

13. The process of claim 12, wherein the lifting device further comprises a mast tilting unit wherein said telescoping mast unit pivots in relation to said horizontal framework.

* * * * *